(12) United States Patent
Fehler

(10) Patent No.: US 11,267,583 B2
(45) Date of Patent: Mar. 8, 2022

(54) APPARATUS FOR CHANGING A DRONE'S POWER SOURCE USING A PAIR OF MOVABLE ENERGY LINKS

(71) Applicant: Menachem Fehler, London (GB)

(72) Inventor: Menachem Fehler, London (GB)

(*) Notice: Subject to any disclaimer, the term of this patent is extended or adjusted under 35 U.S.C. 154(b) by 74 days.

(21) Appl. No.: 16/758,183

(22) PCT Filed: Sep. 28, 2018

(86) PCT No.: PCT/GB2018/052777
§ 371 (c)(1),
(2) Date: Apr. 22, 2020

(87) PCT Pub. No.: WO2019/069057
PCT Pub. Date: Apr. 11, 2019

(65) Prior Publication Data
US 2020/0324913 A1    Oct. 15, 2020

(30) Foreign Application Priority Data

Oct. 4, 2017 (GB) ..................................... 1716194

(51) Int. Cl.
*B64F 1/36* (2017.01)
*B60L 53/66* (2019.01)
(Continued)

(52) U.S. Cl.
CPC .............. *B64F 1/362* (2013.01); *B60L 53/35* (2019.02); *B60L 53/66* (2019.02); *B60L 53/80* (2019.02); *B60L 58/12* (2019.02); *B60L 2200/10* (2013.01)

(58) Field of Classification Search
CPC .......... B60L 53/35; B60L 53/66; B60L 53/80; B60L 58/12; B60L 2200/10; B64F 1/362; B64C 2201/042
See application file for complete search history.

(56) References Cited

U.S. PATENT DOCUMENTS 5,301,765 A    4/1994  Swanson
2014/0319272 A1*  10/2014  Casado Magana ..... B60L 53/14
                                                             244/110 E (Continued)

FOREIGN PATENT DOCUMENTS

CN    202 922 160    5/2013
CN    106 516 138    3/2017
(Continued)

OTHER PUBLICATIONS

International Search Report and Written Opinion of the ISA for PCT/GB2018/052777 dated Feb. 1, 2019, 11 pages.
Search Report for GB1716194.4 dated Mar. 27, 2018, 3 pages.

*Primary Examiner* — David V Henze-Gongola
(74) *Attorney, Agent, or Firm* — Nixon & Vanderhye PC

(57) ABSTRACT

An apparatus (1) for changing a power source of a drone, the apparatus (1) comprises an adaptor (2) for securing a power source (3) to a drone and comprising a first energy connection for supplying energy from the power source (3) and a second energy connection for supplying energy to a drone, wherein one of the first and second energy connections comprises a pair of energy links (20, 21) which are movable between a first position (FIG. 5) to facilitate energy supply and secure the power source (3) to the drone and a second position (FIG. 4) to interrupt energy supply and enable the power source (3) to be removed from the drone.

20 Claims, 12 Drawing Sheets

(51) Int. Cl.
    *B60L 58/12*     (2019.01)
    *B60L 53/35*     (2019.01)
    *B60L 53/80*     (2019.01)

(56) References Cited

U.S. PATENT DOCUMENTS

2016/0339789 A1    11/2016    Wang et al.
2017/0096075 A1*    4/2017    Henry ..................... B64F 1/20

FOREIGN PATENT DOCUMENTS

| KR | 10-2017-0030843 | 3/2017 |
| WO | 2017/220190 | 12/2017 |

* cited by examiner

APPARATUS FOR CHANGING A DRONE'S POWER SOURCE USING A PAIR OF MOVABLE ENERGY LINKS

This application is the U.S. national phase of International Application No. PCT/GB2018/052777 filed Sep. 28, 2018 which designated the U.S. and claims priority to GB Patent Application No. 1716194.4 filed Oct. 4, 2017, the entire contents of each of which are hereby incorporated by reference.

This invention relates generally to an apparatus for changing a power source. More specifically, although not exclusively, this invention relates to an apparatus for changing the power source of a vehicle, for example a drone.

One limitation of vehicles which carry their own source of energy with them is that they will necessarily eventually exhaust that supply of energy, through travel or other use. An example of this issue is in unmanned systems, which may be semi or fully autonomous or may be remote controlled, and may be known as drones. Examples of unmanned systems include unmanned aerial vehicles (UAVs), unmanned ground vehicles (UGVs) and unmanned sea vehicles (USVs). Drones are commonly powered by batteries. When the store of electrical energy in a battery of a drone is nearly depleted it is necessary to land the drone (if it is airborne) and replace or recharge the battery. Accordingly, the useful range of drones from their starting location is limited by the quantity of electrical energy which they are able to carry with them.

In recent years, drones have found increasingly common usage, for example in such fields as delivery and surveillance. As the range of activities to which drones are employed has increased the useful flying range of drones has become a significant limiting factor in their further utilization. Moreover, when operating a large fleet of drones the need to replace batteries on each drone after each flight becomes an onerous and time consuming task. Such replacement of depleted batteries in drones is typically accomplished by hand. This replacement increases the downtime of the drone between flights, thereby increasing the overall cost of drone operation. Moreover, replacement of batteries by hand carries the cost of employment of personnel for carrying out the replacement.

Meanwhile, there are numerous sizes, shapes and types of electric batteries currently on the market and in use in drones (and in other vehicles). Each drone is commonly adapted for use with only a specific size, shape and type of battery. Accordingly, only specific batteries are able to be used with specific drones. Therefore, when replacing a battery in a drone a specific type of battery must be selected for that replacement. If the requisite battery is not available then replacement cannot be effected and the drone will have to remain idle, even if other batteries having different sizes, shapes or types are available for use in a charged condition.

It is therefore a first non-exclusive object of the invention to provide an improved apparatus for changing a battery. It is a further non-exclusive object of the invention to provide an apparatus for changing a battery which at least partially mitigates one or more of the above-identified problems.

Accordingly, a first aspect of the invention provides an apparatus for changing a power source of a drone, the apparatus comprising an adaptor for securing a power source to a drone and comprising a first energy connection for supplying energy from the power source and a second energy connection for supplying energy to a drone, wherein one of the first and second energy connections comprises a pair of energy links which are movable between a first position to facilitate energy supply and secure the power source to the drone and a second position to interrupt energy supply and enable the power supply to be removed from the drone.

The invention thereby provides an apparatus which enables simpler and quicker removal of power sources from drones than is possible with prior art techniques. Advantageously, the apparatus according to the invention enables the changing of a power source of a drone using a single tool (e.g. a robot arm) and/or in a single motion.

The power source may comprise a battery. Where the power source comprises a battery the energy connections may comprise electrical connections and/or the pair of energy links may comprise a pair of contacts. In embodiments, the power source may comprise fuel, for example for a fuel cell or engine. In embodiments, the power source may comprise hydrogen fuel for a hydrogen fuel cell. Where the power source comprises fuel the energy connections may comprise fuel lines and/or the pair of energy links may comprise a pair of fuel conduits.

Hereinafter the power source is referred to as a battery, the energy connections are referred to as electrical connections and the energy links are referred to as contacts. However, it will be appreciated that where a battery is mentioned this may also refer to a power source, where electrical connection(s) are mentioned this may also refer to energy connection(s) and where contact(s) are mentioned this may also refer to energy link(s).

When the pair of contacts are in the second position at least part of the adaptor may be removed or removable from the drone.

Movement of the pair of contacts toward the first position may simultaneously facilitate electrical contact and secure the battery to the drone. Movement of the pair of contacts toward the second position may simultaneously interrupt electrical contact and enable the battery to be removed from the drone (e.g. enable the battery and a first part of the adaptor to be removed from the drone).

The adaptor may comprise a first body configured to support the battery. Where the adaptor comprises a first body configured to support the battery the second electrical connection may comprise the movable pair of contacts. The first body may be configured to support a top, bottom, side, back and/or front surface of a battery, in use. The first body may comprise a support or mount, for example adapted to support or mount (in use) a battery.

The adaptor may comprise a second body, e.g. secured or securable to the drone. The second body may be releasably or non-releasably secured or securable to the drone. Where the adaptor comprises a second body secured or securable to the drone the first electrical connection may comprise the movable pair of contacts.

The first body may comprise a support surface, for example arranged to at least partially support the battery, in use. The first body may comprise one or more trunnions or other elongate members, for example configured to support a battery, in use. The first body may comprise a support plate, for example which may be shaped and/or sized to support a battery, in use. The first body may be attached or attachable to a battery, in use, for example removably or non-removably attached or attachable.

The first body may comprise a frame or enclosure, for example which may be configured to retain and/or surround (at least partially) a battery. The frame or enclosure is hereinafter referred to as a frame, however it will be understood that where frame is mentioned this may also mean an enclosure. The frame may define an inner chamber, for the receipt therein of a battery. The inner chamber may be configured (e.g. sized and/or shaped) to retain therein one or more batteries of different configurations (e.g. sizes, shapes or types). The frame may comprise an opening in communication with the interior chamber, for example through which a battery may be inserted thereinto. The first body may comprise a closure for closing the opening. The closure may be joined or joinable to the frame (e.g. hingedly), for example at or adjacent the opening. The closure may be configured to retain a battery, in use, within the inner chamber of the frame.

The adaptor may comprise a movement means or mechanism, for example operable, in use, to move the pair of contacts from the first position to or toward the second position and/or is operable, in use, to move the pair of contacts from the second position to or toward the first position. The movement means or mechanism may be operable, in use, to expand or increase the or a width of the first body or the second body, for example which may comprise moving the pair of contacts toward the first position. The movement means or mechanism may be operable, in use to contract or decrease the or a width of the first body or the second body, for example which may comprise moving the pair of contacts toward the second position.

The movement means or mechanism may be configured to move both contacts simultaneously, e.g. at least partially simultaneously. The movement means or mechanism may be configured, in use, to move a first of the pair of contacts in a different or the same direction to the second of the pair of contacts. Movement of the pair of contacts to or toward the second position may comprise movement of a first of the pair of contacts toward or away from the second of the pair of contacts. Movement of the pair of contacts to or toward the first position may comprise movement of a first of the pair of contacts toward or away from the second of the pair of contacts. The movement means or mechanism may be configured or arranged to move a first of the pair of contacts in an opposite direction to that of the second of the pair of contacts.

In the first position the pair of contacts may extend or project outboard of the first or second body, e.g. outboard of the periphery of the first or second body. In the second position the pair of contacts may be inboard of the periphery of the first or second body. The pair of contacts may be extendable from one of the first and second bodies, e.g. and extendable into the other of the first and second bodies. The pair of contacts may be retractable into one of the first and second bodies, e.g. and retractable from the other of the first and second bodies. The first body or the second body may comprise one or more contact receivers or electrical link receivers (hereinafter referred to as contact receivers), for example into which the pair of contacts are receivable, in use. Where the first body comprises one or more contact receivers, the, some or each contact receiver may comprise an electrical contact for connection to the battery. Where the second body comprises one or more contact receivers, the, some or each contact receiver may comprise an electrical contact for connection to the drone. The, some or each contact receiver may comprise a recess or aperture into and/or through the first or second body.

The apparatus may comprise one or more further contacts, for example which may be movable to selectively retain or release the battery from the drone, in use. The one or more further contacts may comprise the first or second electrical connection. Alternatively, the one or more further contacts may not provide electrical connection. In embodiments, the one or more further contacts may be movable in a different direction to that in which the pair of contacts are movable. In embodiments, the one or more further contacts may be movable in a different plane to that in which the pair of contacts may be movable. In embodiments, the one or more further contacts may be movable in a direction which is substantially orthogonal to the direction or directions in which the pair of contacts are movable. The movement means or mechanism, where provided, may be operable to move the one or more further pair of contacts, for example in addition to the pair of contacts (e.g. simultaneously thereto).

The apparatus may comprise guide means arranged to guide, in use, receipt of the first and second contacts into the, some or each recess (where provided). The guide means may comprise a lead-in or taper, for example on the, some or each recess and/or on one or each of the pair of contacts.

The second body may comprise two members, for example separate or connected members. The two members may be arranged or arrangeable on a drone to define a space therebetween having a width greater than (e.g. just greater than) the width of the first body (where provided) and/or the battery.

The movement means or mechanism may comprise a gear system, for example a rack and pinion arrangement. The movement means or mechanism may comprise a pair of arms, for example where a first arm is attached or attachable to the first contact and the second arm is attached or attachable to the second contact. The first contact may be attached or attachable at or adjacent a distal end of the first arm. The second contact may be attached or attachable at or adjacent a distal end of the second arm. The first and/or second arm may comprise a geared or toothed surface along at least part of its length. The movement means or mechanism may comprise a pinion gear. The pinion gear may be arranged, in use, to move (e.g. directly or indirectly) the first and/or second arm (for example to contact a geared or toothed surface thereof). The pinion gear may be arranged, in use, between the first and second arms.

The movement means or mechanism may comprise a pivot device or mechanism. The pivot device or mechanism may comprise one or more arms pivotably connected to a rotatable member. Where two arms are provided, the pair of contacts may be attached or attachable at or near a free end of the or each arm, e.g. spaced from the pivot connection of the arms to the rotatable member. The pivot device or mechanism may be arranged such that, in use, rotation of the rotatable member causes the two arms to pivot relative thereto, for example to move the pair of contacts between the first and second positions.

The apparatus may comprise a battery. The apparatus may comprise a drone.

The apparatus may comprise an engagement means or mechanism for engaging, in use, the adaptor and causing the pair of contacts to move toward and/or away from the first position. The engagement means or mechanism may be movable, in use, to engage with the movement means or mechanism (where provided) of the adaptor. The engagement means or mechanism may comprise a key. The adaptor (e.g. the movement means or mechanism, where provided) may comprise a lock, for example configured to be engaged by the key of the engagement means or mechanism. The pinion gear (where provided) may comprise the lock. The key and lock may be configured to be engageable, in use, such that when the key is rotated rotation of the lock relative to the key is reduced or prevented.

The key may comprise an elongate member, for example comprising a non-round cross-section. The elongate member may comprise one or more splines or rebates, for example extending at least partially along its length.

The lock may comprise an elongate aperture or slot, for example comprising a non-round internal cross-section. The elongate aperture or slot may comprise one or more rebates or splines, for example extending at least partially along its length. The one or more rebates or splines of the elongate aperture may be configured to receive (e.g. in a keying manner) respective one or more splines or rebates of the elongate member.

The movement means or mechanism may comprise a restriction, for example configured to restrict movement (e.g. rotation) of the key, in use, within the lock. The key may comprise an abutment, for example configured to engage, in use, the restriction of the movement means or mechanism.

The apparatus may comprise a support or lifting means or mechanism, for example for moving (e.g. supporting or lifting) a battery to or from a drone, in use. The support or lifting means or mechanism may be configured, in use, to enable removal of the battery from the drone and/or insertion of the battery into or onto the drone. The adaptor and/or the engagement means may comprise the support or lifting means or mechanism. The support or lifting means or mechanism may be configured, in use, to move the engagement means or mechanism to engage with the movement means or mechanism. The support or lifting means or mechanism may comprise one or more projections and one or more cooperating recesses. The or each projection may be configured, in use, to engage within the or each recess, for example to facilitate lifting of the battery relative to the drone.

The engagement means or mechanism may be rotatable, in use, relative to the battery and/or the drone. In embodiments, the key (where provided) may be rotatable, in use, relative to the battery and/or drone. The engagement means or mechanism may comprise a prime mover, for example operable to move (e.g. to rotate) the engagement means or mechanism (e.g. the key member, where provided), in use. The prime mover may comprise one or more motors. When the key is engaged within the lock, in use, rotation of the key may cause the pair of contacts to move to or toward the first position and/or cause the pair of contacts to move to or toward the second position.

The apparatus may comprise a sensing means or a sensor, for example configured or configurable to detect successful electrical and/or mechanical connection of the battery to the drone and/or to detect successful electrical and/or mechanical disconnection of the battery from the drone. The sensing means or sensor may comprise a limit switch. The engagement means or mechanism (e.g. the key) may comprise the sensing means or sensor.

The apparatus may comprise a landing surface configured for a drone to land thereupon. The landing surface may be sized and/or shaped to support more than one drone simultaneously. The landing surface may comprise markings and/or features indicative of specific locations on the landing surface. The landing surface may be supported or supportable, in use, at a raised location relative to the ground, for example supported or supportable by a stand. The landing surface may be generally circular in plan. The landing surface may be rotatable relative to the ground. The apparatus may comprise a rotation mechanism for rotating the landing surface relative to the ground. The rotation mechanism may comprise one or more motors or other prime moving devices.

The apparatus may comprise a store for storing batteries. The store may be configured or configurable to replenish or recharge a power source or battery. The store may be configured or configurable to monitor the status of a power source or battery. The store may be configured or configurable to transmit information relating to the status of a power source or battery. The status of the power source or battery may comprise energy level or supply or charge of the power source or battery. The store may be located or locatable under, in use, the landing surface (for example partially or completely under the landing surface). The store may be fixed, in use, relative to the landing surface. Alternatively, the store may be movable, in use, relative to the landing surface (for example rotatable relative to the landing surface). The rotation mechanism (where provided) may be operable to rotate, in use, the store relative to the ground.

The store may comprise plural chambers, slots or areas within which batteries may be stored. The store may comprise charging means for electrically charging one or battery stored therewithin. The charging means may comprise one or more second body.

The apparatus may comprise a battery replacement device, for example configured or configurable to remove a battery from a drone and/or to insert a battery into or onto a drone. The battery replacement device may comprise a robot arm. The robot arm may comprise an articulated, Cartesian, cylindrical, polar or SCARA robot, or any combination thereof. The robot arm may be attached or attachable to the engagement means or mechanism (where provided). The robot arm may be operable, in use, to move a battery from the store (where provided) to a drone, for example on the landing surface (where provided). The robot arm may be configured or configurable (e.g. programmed or programable) to replace automatically the battery in a drone, e.g. located on the landing surface.

A further aspect of the invention provides a drone comprising an adaptor as described above.

A yet further aspect of the invention provides an apparatus for changing a load of a drone, the apparatus comprising an support and an adaptor for securing load to a drone, the adaptor comprising a first pair of contacts which are movable between a first position to secure the load to the drone and a second position to enable the load to be removed from the drone, the support being removably engageable with the adaptor to move the payload into engagement with and away from the drone and comprising an tool for causing the contacts to move from the first position to the second position and vice versa.

For the avoidance of doubt, any of the features described herein apply equally to any aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

Embodiments of the invention will now be described by way of example only with reference to the accompanying drawings in which.

Figure 1:
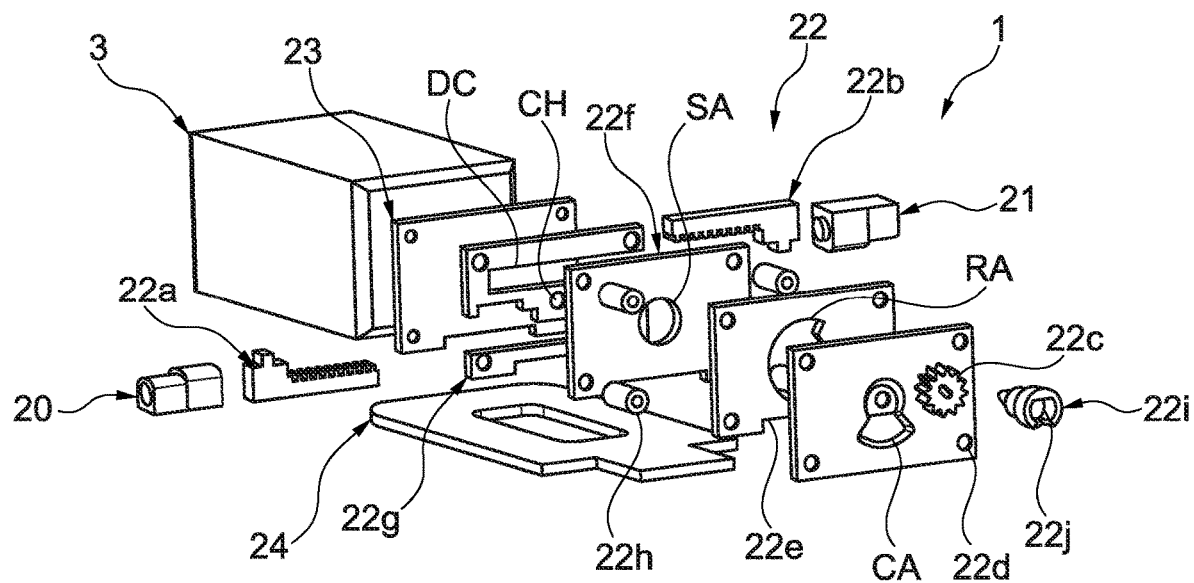
FIG. 1 is a perspective exploded view of an apparatus for changing the battery of a drone according to an embodiment of the invention.

Referring now to FIGS. 1 to 7, there is shown an apparatus 1 for changing the battery of a drone according to a first embodiment of the invention, the apparatus 1 comprising an adaptor unit 2 for securing a battery to a drone, a battery 3, a tool 4 for attaching the adaptor unit 2 to a drone, and an adaptor socket 5 for securing the battery 3 to a drone.

The adaptor unit 2 comprises a first electrical connection (not shown), first and second electrical contacts 20, 21, a movement mechanism 22, an attachment plate 23 and a support plate 24.

The first electrical connection is configured, when the adaptor unit 2 is attached to the battery 3, to make electrical contact with the battery 3.

The first and second electrical contacts 20, 21 comprise a second electrical connection for making, in use, electrical contact with a drone (not shown). The first and second electrical contacts 20, 21 are attached, in use, to the movement mechanism 22. The first and second electrical contacts 20, 21 may be formed from any suitable electrically conductive material, for example copper. The first and second electrical connections are electrically connected to one another.

The movement mechanism 22 comprises a gear arrangement, in this embodiment, comprising first and second rack gears 22a, 22b and a pinion gear 22c. The movement mechanism further comprises a front plate 22d, first and second intermediate plates 22e, 22f, a directing plate 22g, plural spacers 22h and a locking member 22i.

The front plate 22d comprises a central aperture CA through its thickness. The first intermediate plate 22e comprises a restriction aperture RA through its thickness. The second intermediate plate 22f comprises a spacer aperture SA through its thickness. The apertures CA, RA, SA are positioned such that they are aligned when the movement mechanism 22 is in an assembled state. The apertures CA, RA, SA are configured such that the locking member 22i is rotatably retained or retainable therewithin, in use. The central aperture CA is shaped to correspond to the shape of a projection 40 on the tool 4 and to allow the projection 40 to be inserted therethrough, in use (where the tool 4 is described in greater detail below in respect of FIGS. 2 and 3). The restriction aperture RA is shaped to enable partial rotation therewithin, in use, of the projection 40 on the tool 4. The spacer aperture SA is sized to be smaller than the projection 40 on the tool 4 and to thereby restrict further axial displacement of the projection toward the pinion gear 22c, when the tool 4 is inserted into the adaptor unit 2.

The directing plate 22g comprises first and second directing channels DC for directing movement of, respectively, the first and second rack gears 22a, 22b, in use. A central circular hole CH in the directing plate 22g is configured to locate a central axis of the pinion gear 22c. The central circular hole CH is positioned such that it is aligned with the apertures CA, RA, SA of the front plate 22d, first intermediate plate 22e and second intermediate plate 22f when the movement mechanism 22 is assembled.

The plural spacers 22h, which are tubes in this embodiment, are configured to space the directing plate 22g from the second intermediate plate 22f, in an assembled state.

The first contact 20 is attached to a first, distal end of the first rack gear 22a. The second contact 21 is attached to a first, distal end of the second rack gear 22b.

The locking member 22i is configured to be attached, in use, to the pinion gear 22c and to be rotatable within the apertures CA, RA, SA of the front, first intermediate and second intermediate plates 22d, 22e, 22f. When the locking member 22i is attached to the pinion gear 22c relative rotation thereof to the locking member 22i is prevented or at least substantially impeded. The locking member 22i comprises a lock 22j which is configured to correspond to a key 42 of the tool 4 (which will be described in greater detail below). The lock 22j is accessible, in use, when the locking member 22i is attached to the pinion gear 22c in an assembled condition.

Figure 2:
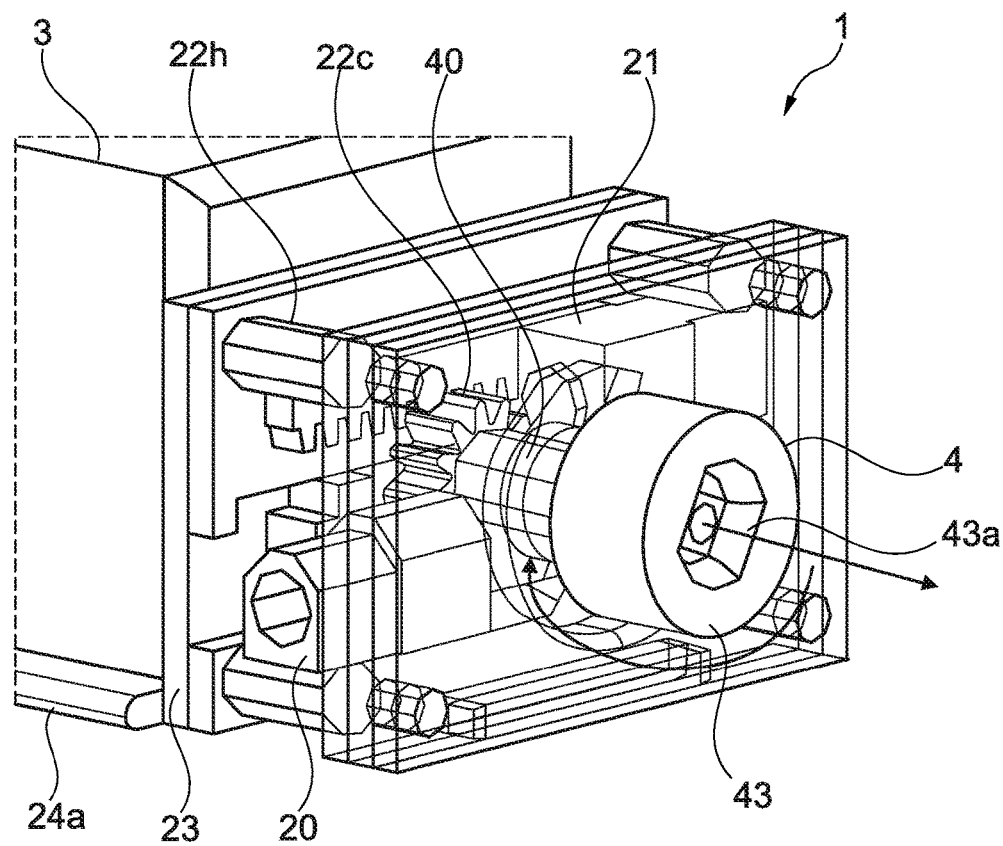
FIG. 2 is a perspective partial view of the apparatus shown in FIG. 1 in a first condition.
Figure 3:
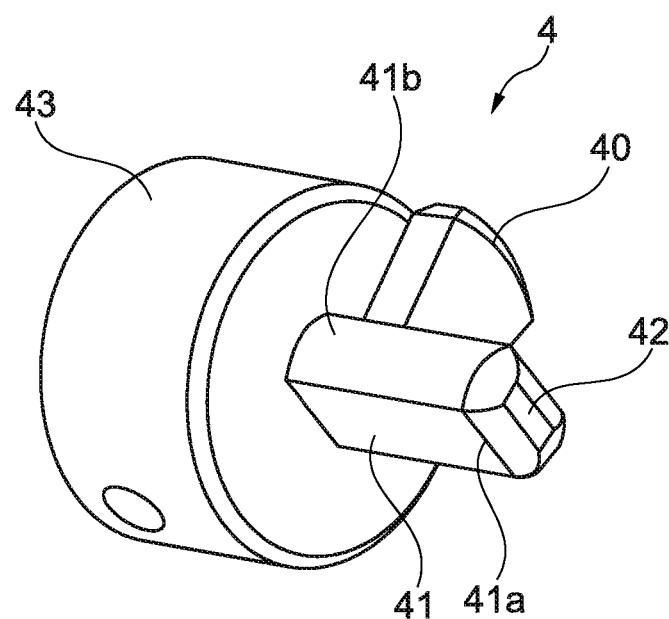
FIG. 3 is a perspective view of the tool shown in FIG. 1.

In an assembled state (as shown in FIG. 2) an axial projection (not shown) of the pinion gear 22c is rotatably located within the central circular hole CH of the directing plate 22g. The first and second rack gears 22a, 22b are partially located within, respectively, the first and second directing channels DC such that the toothed surface of each rack gear 22a, 22b meshes with teeth on the pinion gear 22c. The second intermediate plate 22f, first intermediate plate 22e and then front plate 22d are then secured over the gear arrangement with the plural spacers 22h positioned between the second intermediate plate 22f and the directing plate 22g and adjacent the periphery thereof. The locking member 22i is secured to the pinion gear 22c and is rotatably retained within the apertures CA, RA, SA through the front plate 22d, first intermediate plate 22e and second intermediate plate 22*f*. Securement of the plates 22*d*, 22*e*, 22*f*, 22*g* to one another is effected by securements such as bolts (not shown), in this embodiment.

The attachment plate 23 is configured to enable the adaptor unit 2 to be attached to a surface of the battery 3. Said attachment may be achieved by any suitable means (for example by securements such as screws or the like and/or by adhesive).

The support plate 24 is configured to support the battery 3, when the adaptor unit 2 is attached to the battery 3. The support plate 24 may be formed from any suitable material, for example metal, plastic and/or wood. The support plate 24 is sized and/or shaped such that, when the battery 3 is supported thereon, side edges 24*a* of the support plate extend outboard of sides of the battery (as shown in FIG. 2). These side edges 24*a* of the support plate provide rails 24*a* for securing the battery 3 to a drone, in use.

The battery 3 may be of any suitable type but is preferably a secondary cell.

The tool 4 (as shown more clearly in FIGS. 2 and 3) comprises a main body 41 having a key 42 at a first, distal end 41*a* and an engagement member 43 at a second, proximal end 41*b*. Intermediate the two ends 41*a*, 41*b* a projection 40 is provided. The projection 40 has a fan shape, in this embodiment, and flares outwardly from a point of connection to the main body 41 of the tool 4 The projection 40 is formed integrally, in this embodiment, with the main body 41 of the tool 4. In embodiments, however, the projection 40 may be a separate component attached or attachable to the main body 41 of the tool 4. The key 42 is configured (e.g. sized and shaped) to correspond (e.g. in a locking manner) to the lock 22*j* of the locking body 22*i*. The engagement member 43 comprises a cylindrical body with a recess 43*a* into a flat end thereof (as shown in FIG. 2). The recess 43*a* has a non-round periphery, in plan.

Figure 4:
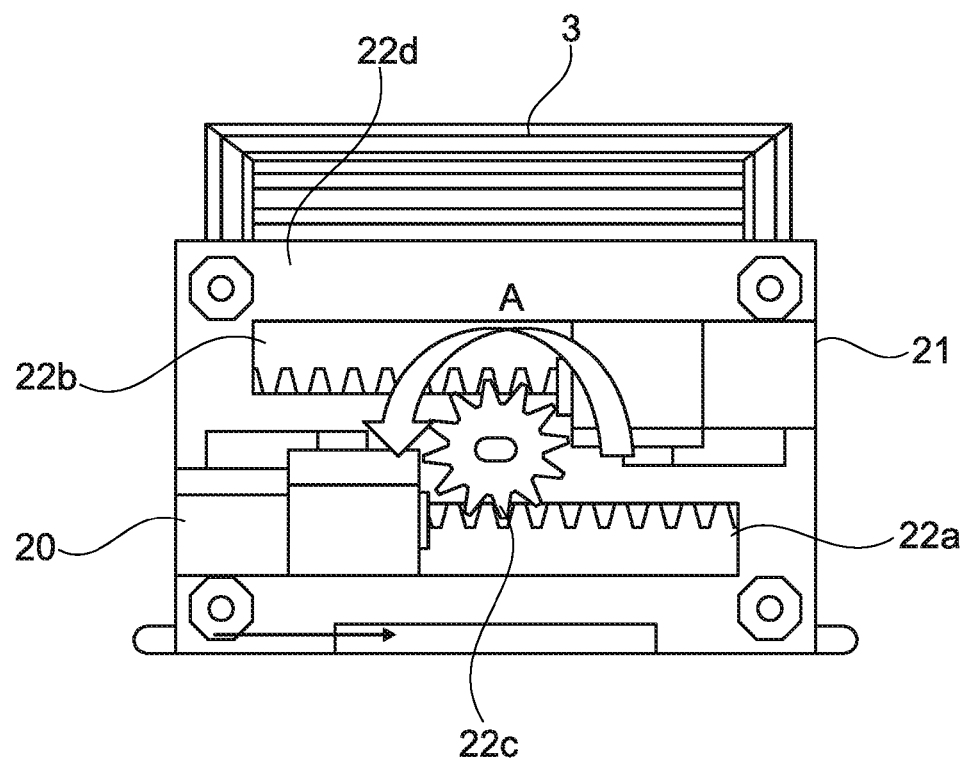
FIG. 4 is an end view of the apparatus shown in FIG. 1 in the first condition.
Figure 5:
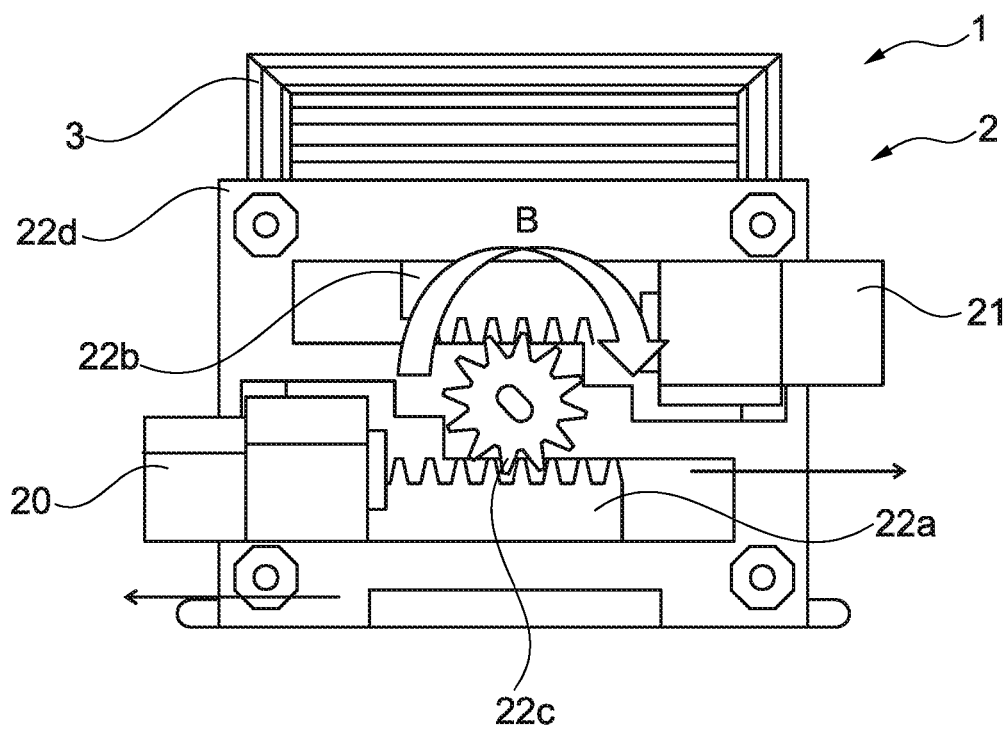
FIG. 5 is an end view of the apparatus shown in FIG. 1 in a second condition.

In a first condition (as shown in FIGS. 2 and 4) the first and second contacts 20, 21 are inboard of the periphery of the plates 22*d*, 22*e*, 22*f*, 22*g* of the adaptor unit 2. In a second condition (as shown in FIG. 5) the first and second contacts 20, 21 are at least partially outboard of the periphery of the plates 22*d*, 22*e*, 22*f*, 22*g* of the adaptor unit 2. Movement from the second to the first position is effected by rotation of the pinion gear 22*c* (in the direction of arrow A in FIG. 4) relative to the contacts 20, 21, which causes the rack gears 22*a*, 22*b* to translate, hence translating the contacts 20, 21 attached thereto. Movement from the first to the second position is effected by rotation of the pinion gear 22*c* (in the direction of arrow B in FIG. 5) relative to the contacts 20, 21, which causes the rack gears 22*a*, 22*b* to translate, hence translating the contacts 20, 21.

Figure 6:
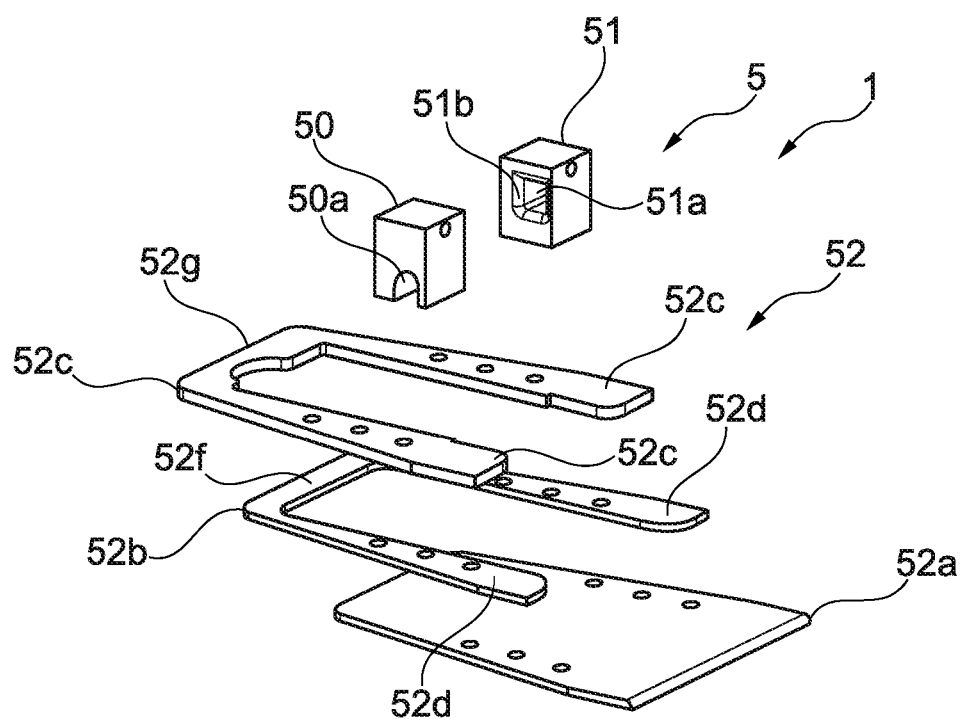
FIG. 6 is a perspective exploded view of an adaptor socket to which the apparatus shown in FIG. 1 is attachable.
Figure 7:
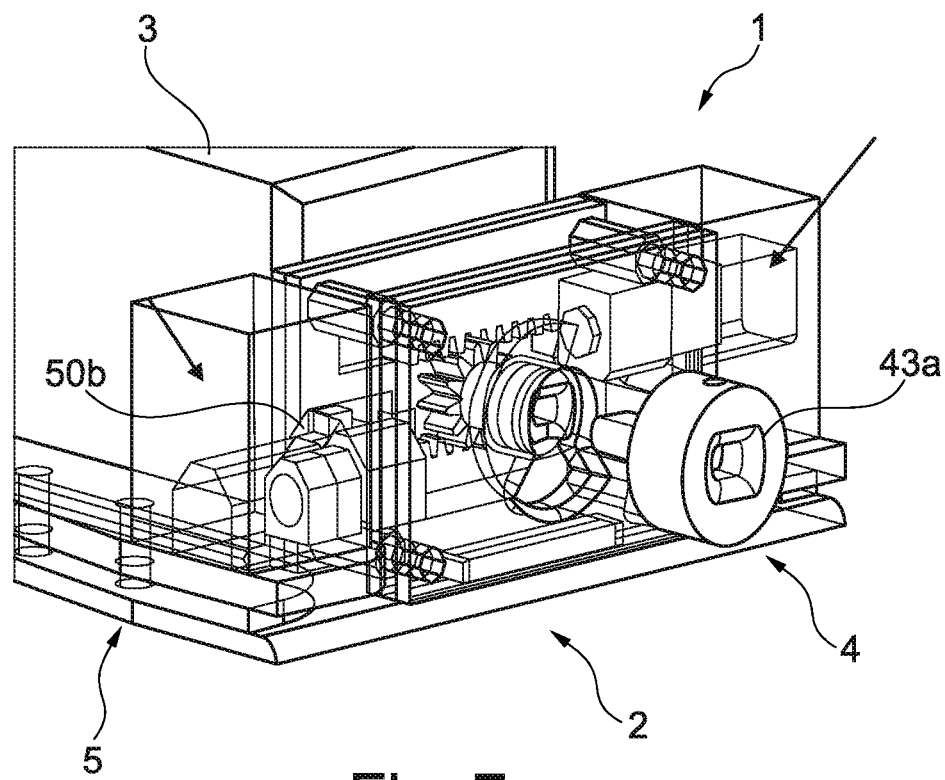
FIG. 7 is a perspective partial view of the apparatus shown in FIG. 1 in the second condition and attached to the adaptor socket shown in FIG. 6.

Referring now to FIG. 6, there is shown an adaptor socket 5 to which the adaptor unit 2 shown in FIG. 1 can be secured, in use. The adaptor socket 5 comprises first and second socket bodies 50, 51 and a rail apparatus 52. In embodiments, however, the adaptor socket 5 may not comprise the rail apparatus 52.

The first and second socket bodies 50, 51 each comprise a contact receiver 50*a*, 51*a* which are configured to receive, in use, one of the first and second contacts 20, 21 of the adaptor unit 2. In this embodiment, the contact receivers 50*a*, 51*a* comprise apertures through the thickness of each socket body 50, 51. In embodiments, however, the contact receivers 50*a*, 51*a* may comprise recesses. The contact receivers 50*a*, 51*a* are sized and shaped to at least partially correspond to the size and shape of the first and second contacts 20, 21. Electrical contacts are provided inside each of the contact receivers 50*a*, 51*a*, for example on an inner surface thereof. The socket bodies 50, 51 comprise lead-in portions 50*b*, 51*b* about the periphery of each contact receiver 50*a*, 51*a*. The lead-in portions 50*b*, 51*b* are configured to guide, in use, the contacts 20, 21 into engagement within the contact receivers 50*a*, 51*a* when the contacts 20, 21 are moved toward the first position.

The rail apparatus 22 comprises a rail base 52*a*, a rail middle 52*b* and a rail top 52*c*. The rail middle 52*b* and the rail top 52*c* each comprise first and second side members 52*d*, 52*e* which are spaced from one another and are joined together at one end by an end member 52*f*, 52*g*. The distance between the side members 52*d* of the rail middle 52*b* is slightly greater than is the distance between the side members 52*e* of the rail top 52*c*.

When rail apparatus 52 is assembled, the rail base 52*a*, rail middle 52*b* and rail top 52*c* form internal slots extending along the side members 52*d* of the rail middle 52*b* and under (in use) the side members 52*e* of the rail top 52*c*. The internal slots are configured to slidably receive, in use, the side edges 24*a* of the support plate 24. The first and second socket bodies 50, 51 are attached, when assembled, to the side members 52*e* of the rail top 52*c*, at or adjacent a free end thereof, such that the contact receivers 50*a*, 51*a* are directed toward one another. When the adaptor socket 5 is attached at or to a site of use on a drone an electrical connection is connected between the drone 5 and each of the electrical contacts in the contact receivers 50*a*, 50*b*.

Installation of a battery into a drone may be achieved as follows. The battery 3 is attached to the adaptor unit 2 in such a way that the battery 3 is supported by the support plate 24. The key 42 of the tool 4 is inserted into, and engaged in a locking manner with, the lock 22*j* in the locking member 22*i*. If not already in the second position, the pair of contacts 20, 21 are then retracted into the second position. Movement to the second position is achieved by rotation of the tool 4 relative to the battery 3, thus causing rotation of the locking member 22*i* and hence the pinion gear 22*c* to which it is attached. Rotation of the pinion gear 22*c* causes translation of the rack gears 22*a*, 22*b* and, therefore, movement of the contacts 20, 21 which are attached to the rack gears 22*a*, 22*b*.

The battery 13 is then moved to a drone, which may be accomplished by engaging the recess 43*a* in the tool 4. The projection 40 of the tool 4 is retained between the front plate 22*d* and the second intermediate plate 22*f* when the tool 4 is rotated to cause the contacts 20, 21 to move toward the second position. Advantageously, the projection 40 thereby helps to manoeuvre the battery 3 when the battery 3 is moved by moving the tool 4. Movement may be effected by a suitable robot or by a human operator. The battery 3 with the adaptor unit 2 attached is then slid into engagement with an adaptor socket 5 secured to the drone. The side edges 24*a* of the support plate 24 are aligned with and slid into the internal slots of the rail assembly 52. The adaptor unit 2 is slid into the rail assembly 52 of the adaptor socket 5 until the contact receivers 50*a*, 51*a* in the first and second socket bodies 50, 51 are aligned with the first and second contacts 20, 21 of the adaptor unit 2. Correct alignment may be aided by the provision of an abutment on the rail assembly 52, where the abutment is configured to abut an end or other part of the support plate 24 when correct alignment of the contacts 20, 21 and contact receivers 50*a*, 51*a* is achieved.

The tool 4 is then rotated relative to the battery, in the direction of arrow B (shown in FIG. 5). In this way, the pinion gear 22*c* is caused to rotate, which in turn causes the first and second rack gears 22*a*, 22*b* to translate relative to the battery 3 and drone. The first and second contacts 20, 21 are thereby caused to move from the first position toward the second position, such that each contact 20, 21 projects outboard of the periphery of the plates 22d, 22e, 22f, 22g of the adaptor unit 2. The first and second contact 20, 21 thereby engage into, and are received by, the respective contact receivers 50a, 51a in the first and second socket bodies 50, 51 of the adaptor socket 5. In this way, the first and second contacts 20, 21 facilitate both electrical contact to the drone and secure the battery 3 to the drone.

Advantageously, movement of the first and second contacts 20, 21 between the first and second positions produces reduced wear and tear on the battery 3 and drone and a relatively reduced likelihood of failure of the connection therebetween over time (with respect to prior art mechanical connections). We have surprisingly found that by moving the first and second contacts 20, 21 in directions which are substantially perpendicular to the direction of insertion of the battery 3 into (and removal of the battery from) the drone, forces applied to the battery 3 and drone during installation and/or removal of the battery are significantly reduced. Accordingly, use of the invention renders the battery 3 and/or drone less susceptible to damage, during insertion and removal of the battery 3, than is the case with prior art techniques for securing and electrically connecting a battery to a drone. Therefore, replacement and/or repair of the battery 3 and/or drone is relatively less frequent using the apparatus 1 of the invention with consequential cost savings.

Referring now to FIGS. 8 to 13, there is shown an apparatus 11 for changing the battery of a drone, according to a further embodiment of the invention, in which features similar to those of the apparatus 1 shown in FIGS. 1 to 7 are identified by a preceding '1' and will not be described herein further. The apparatus 1 shown in FIGS. 8 to 13 differs from that shown in FIGS. 1 to 7 in that the movement mechanism 122 includes a unitary body 125 instead of plural plates, a pair of engagement tines 126 are provided instead of a support plate, and the pinion gear 122c comprises the lock 122j (with a locking member not provided).

The engagement tines 126 are elongate and each have a tapered, free end 126a spaced from the body 125 of the adaptor unit 12. The unitary body 125 of the adaptor unit 12 comprises apertures (not shown) on each of its sides, where each aperture is aligned with and arranged to allow, in use, at least part of the contacts 120, 121 to extend therethrough.

Support apertures 127 extend through the body 125 of the adaptor unit 12, configured to receive lifting members 144 of the key 14, as will be described in greater detail below.

The first, distal end of each rack gear 122a, 122b to which the contacts 120, 121 are attached extends at an angle relative to the toothed portion of that rack gear 122a, 122b. Due to these bends at the first, distal ends of the rack gears 122a, 122b the contacts 120, 121 are directly aligned with one another, on opposed sides of the pinion gear 122c.

Figure 9:
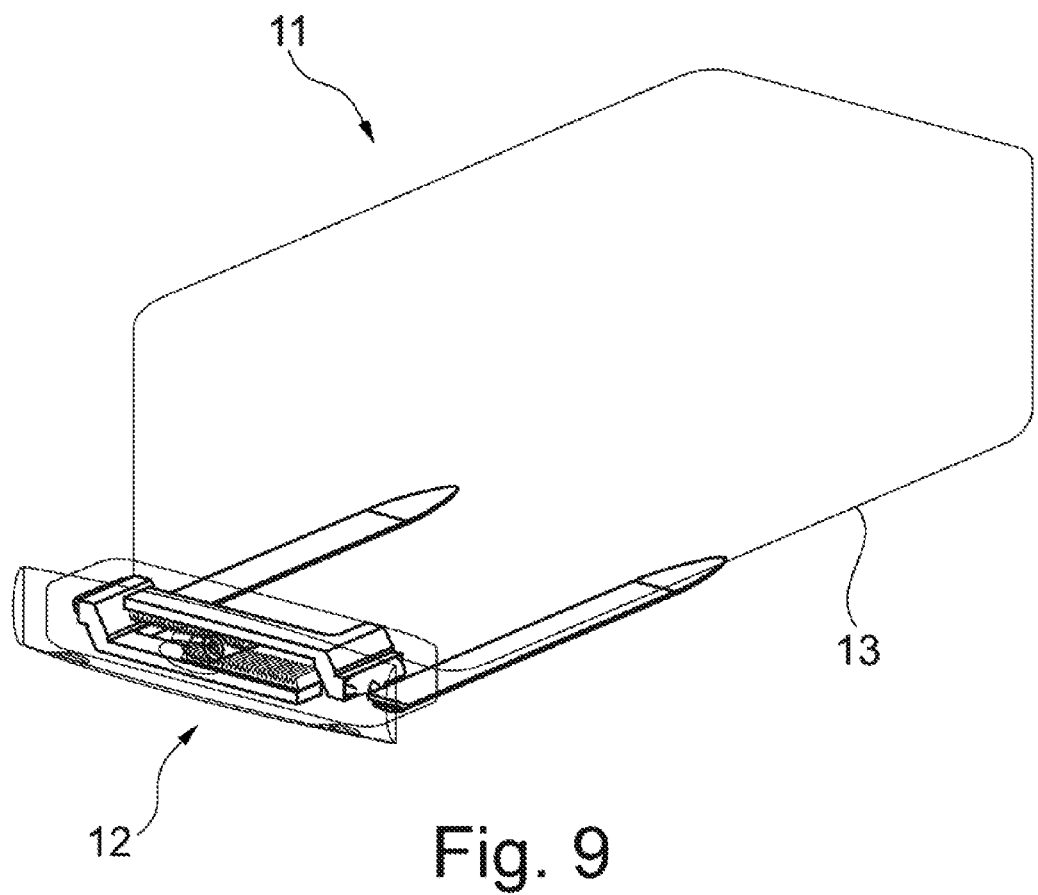
FIG. 9 is a perspective view of the apparatus shown in FIG. 8 attached to a battery.

The body 125 of the adaptor unit 12 is attached, in use, to a surface of a battery 13, as shown in FIG. 9.

Figure 8:
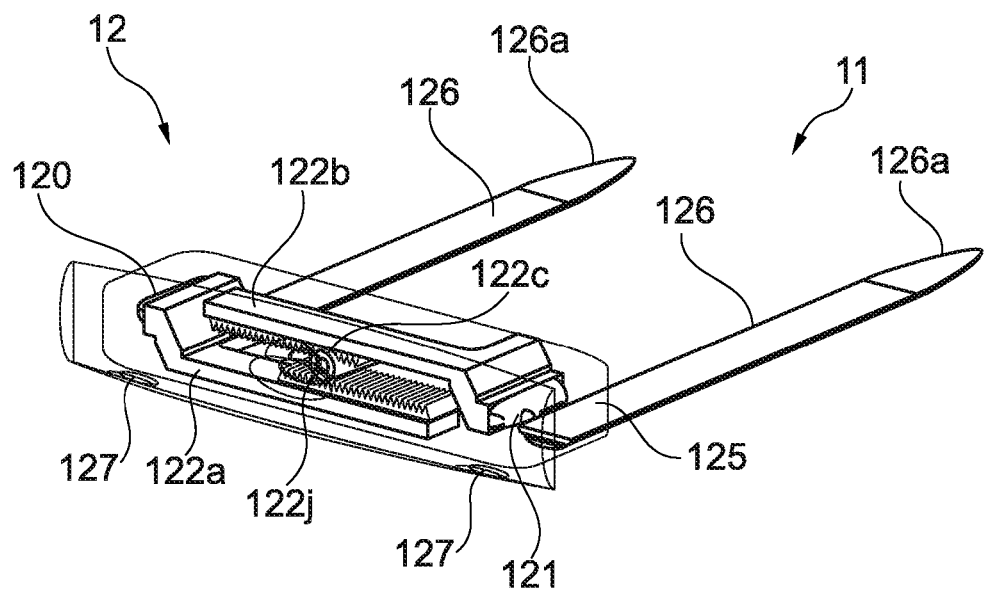
FIG. 8 is a perspective view of an apparatus for changing the battery of a drone according to a further embodiment of the invention.
Figure 10:
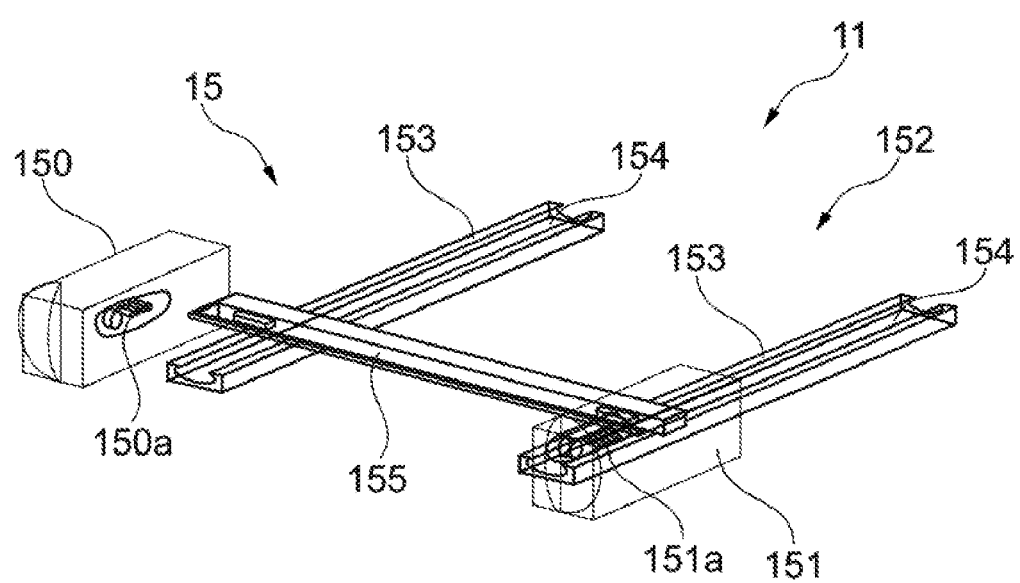
FIG. 10 is a perspective view of a further adaptor socket for use with the apparatus shown in FIG. 8.

Referring now to FIG. 10, there is shown an adaptor socket 15 to which the adaptor unit 12 shown in FIG. 8 can be attached, in use. The adaptor socket 15 shown in FIG. 10 differs from that shown in FIG. 6 in that the rail apparatus 152 is absent the rail base, rail middle and rail top and instead includes side rails 153, each of which includes an elongate slot 154 along its length. Each slot 154 is configured to slidingly receive one of the elongate tines 126 of the adaptor unit 12 shown in FIG. 8. Each elongate slot 154 has return portions therealong which are configured to restrain the tines 126 (when received within the slots 154) from moving relative to the slots 154 except along the major axis thereof. A cross member 155 extends perpendicularly to the side rails 153 connecting them together and locating them at the correct spacing for receipt of the tines 126 of the adaptor unit 12. The cross member 155 connects at its free ends to the socket bodies 150, 151, thereby providing correct spacing between the socket bodies 150, 151 relative to the width of the adaptor unit 12 (shown in FIG. 8).

Advantageously, due to the aligned contacts 120, 121 of the adaptor unit 12 the contact receivers 150a, 151a may be located at the same height (relative to a drone, when installed thereon) in the socket bodies 150, 151. Accordingly, socket bodies 150, 151 may be formed which can be interchangeably used for receipt of either of the contacts 120, 121 of the adaptor unit 12, with a consequential saving in expense of tooling for manufacture and also storage and transport of replacement parts.

Figure 11:
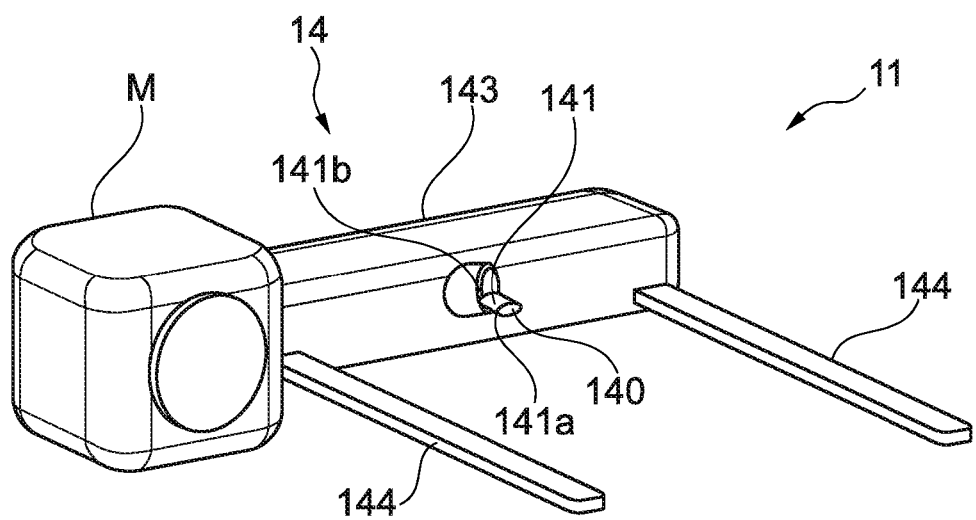
FIG. 11 is a perspective view of a tool for attaching and/or removing the apparatus shown in FIG. 8 to and/or from the adaptor socket shown in FIG. 10.

Referring now to FIG. 11, there is shown a tool 14 for attaching the adaptor unit 12 to a drone. The tool 14 shown in FIG. 11 differs from that shown in FIGS. 2 and 3 in that the engagement member 143 at the second, proximal end 141b of the main body 141 is attached to a motor M and comprises lifting members 144 extending therefrom. The engagement member 143 of the tool 14 shown in FIG. 11 has a rectangular cross-section. In embodiments, however, the engagement member 143 may comprise any suitable shape.

The lifting members 144 comprise elongate rods 144, in this embodiment, and are configured to engage through the support apertures 127 of the adaptor unit 12 (shown in FIG. 8). The main body 141 of the tool 14 is rotatably attached to the engagement member 143 such that the main body 141 can rotate, in use, relative to the engagement member 143.

The main body 141 of the tool 14 is attached to the motor M by a connection (not shown) configured to cause the main body 141 to rotate relative to the engagement member 143 when the motor is actuated. The connection may be provided at least partially inside the engagement member 143 and may comprise a chain or belt or gear system or the like.

Figure 12:
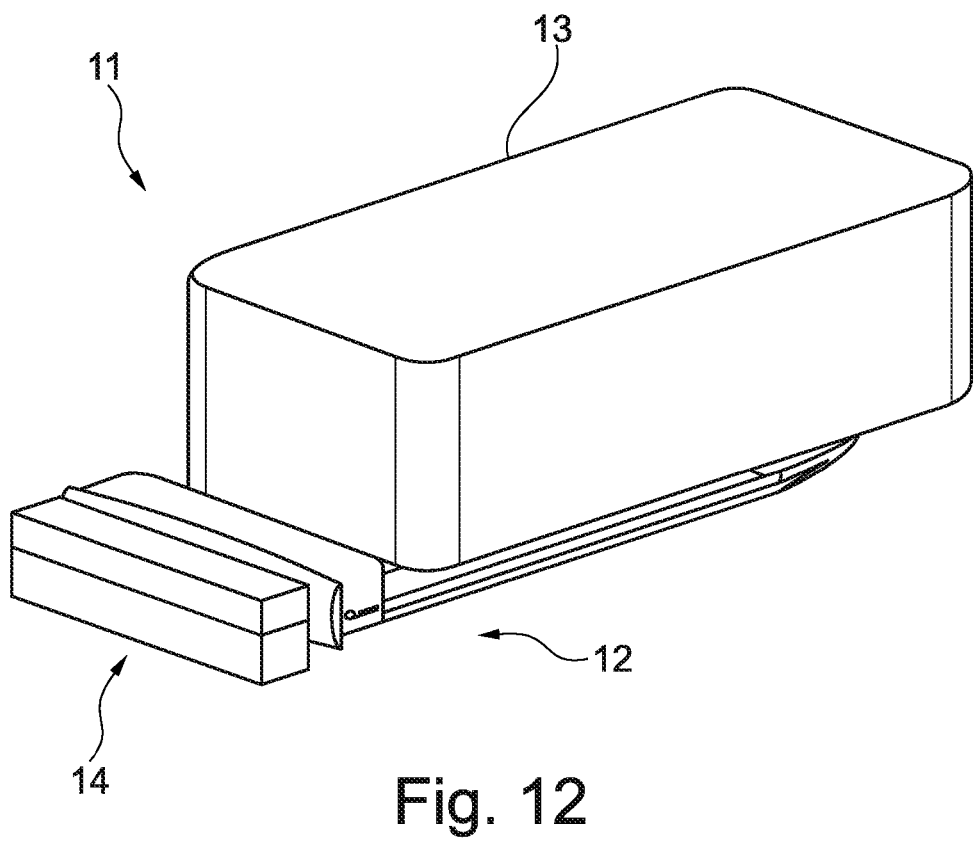
FIG. 12 is a perspective view of the tool shown in FIG. 11 engaged with the apparatus shown in FIG. 8 attached to a battery.
Figure 13:
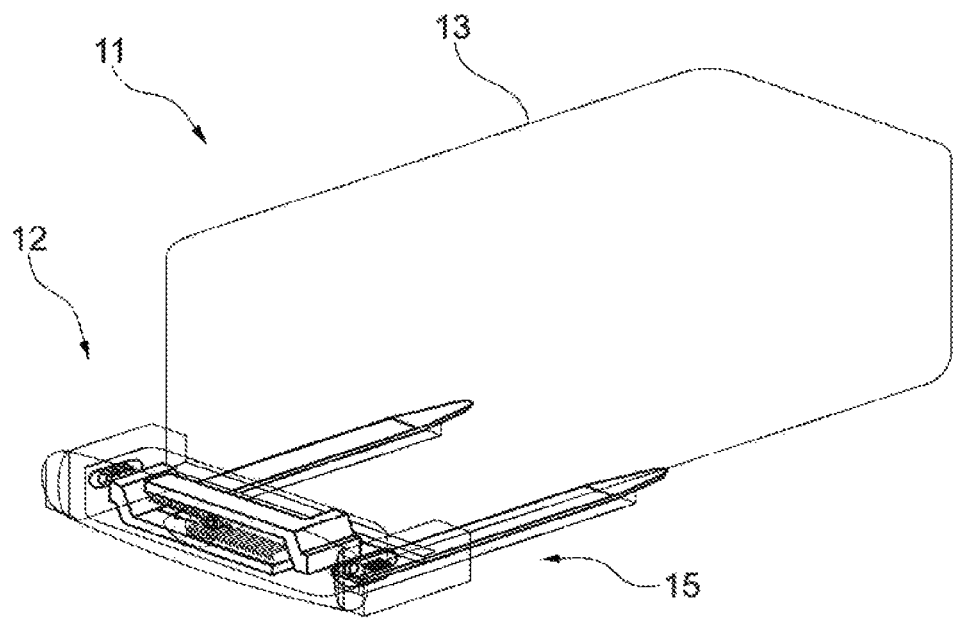
FIG. 13 is a perspective view of the apparatus shown in FIG. 8 attached to the adaptor socket shown in FIG. 10 and attached to a battery.

In use, the lifting members 144 of the tool 14 are inserted into and through the support apertures 127 in the body 125 of the adaptor unit 12 (as shown in FIG. 12). The key 140 at the first, distal end 141a of the main body 141 of the tool 14 is inserted into the lock 122j in the pinion gear 122c of the adaptor unit 12. In this way, the tool is attached to the adaptor unit 12 and battery 13 which may therefore be moved between locations through movement of the engagement member 143.

Attachment of the battery 13 to a drone then comprises moving the adaptor unit 12 and attached battery 13 to an adaptor socket 15 attached to a drone. The adaptor unit 12 and attached battery 13 is moved to a position such that the tapered, free ends 126a of the engagement tines 126 align with the ends of the elongate slots 154 in the side rails 153 of the adaptor socket 15. The engagement tines 126 are then slid into the slots 154 in the side rails 153 until the first and second contacts 120, 121 of the adaptor unit 12 align with the contact receivers 150a, 151a in the adaptor socket 15. The key 140 of the tool 14 is then rotated relative to the battery 13 and drone, where rotation is driven by actuation of the motor M. Rotation of the pinion gear 122c by the key 140 causes the first and second contacts 120, 121 to move to the first position (as described above in respect of FIG. 4) and thereby engage into the contact receivers 150a, 151a of the adaptor socket 15. The battery 13 is thereby secured to the drone and electrical contact between the battery 13 and the drone is effected. Removal of a battery 3 from a drone comprises engaging the tool 14 with the adaptor unit 12 as described above, and then relatively rotating the pinion gear 122*c* to retract the contacts 20, 21 to the second position, whereby the battery 13 and adaptor unit 12 may be removed from the drone.

Figure 14:
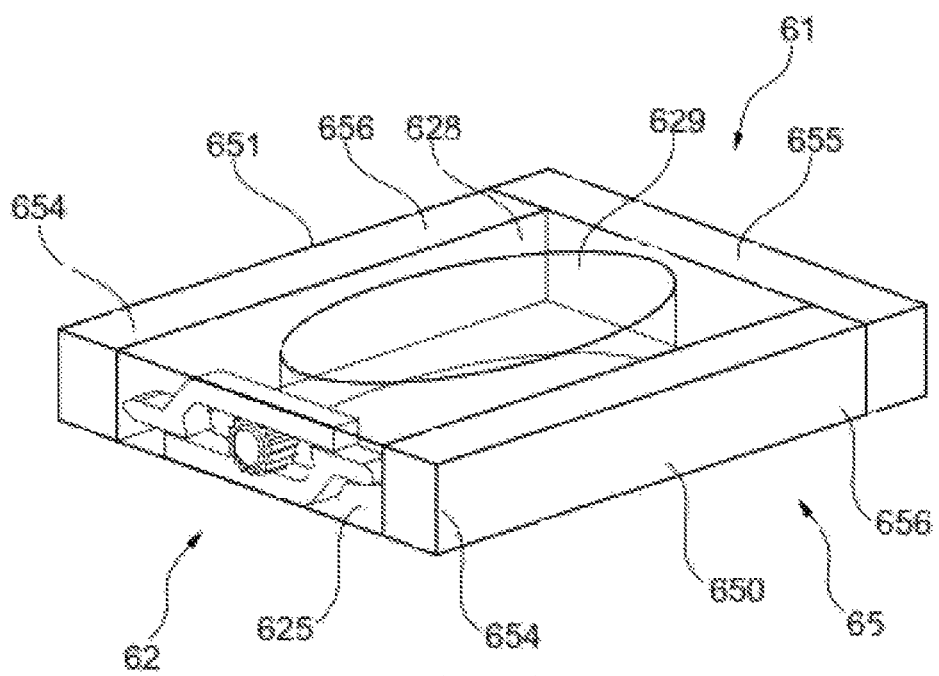
FIG. 14 is a perspective view of an apparatus for changing the battery of a drone according to a further embodiment of the invention attached to a further adaptor socket.

Referring now to FIG. 14, there is shown an apparatus 61 for changing the battery of a drone, according to a further embodiment of the invention, in which features similar to those of the apparatus 1 shown in FIGS. 1 to 7 are identified by a preceding '6' and will not be described herein further. The apparatus 61 shown in FIG. 14 differs from that shown in FIGS. 8 to 13 in that the body 625 of the adaptor unit 62 comprises a support surface 628 for supporting a battery, in use. The body 625 is elongate with a substantially flat support surface 628. A central aperture 629 extends through the body 625, in plan. The central aperture 629 reduces the volume of material required by the body 625 without impacting the body's 625 ability to support a battery, in use. The material savings help to reduce the weight of the apparatus 61 and to reduce material use, with consequential cost benefits.

The adaptor unit 62 is absent the engagement tines 126 shown in the FIG. 8 embodiment. In embodiments, the apparatus 61 may comprise a battery (for example the battery shown in FIG. 1 or FIG. 9) and/or a tool (for example the tool shown in FIGS. 2 and 3 or the tool shown in FIG. 11).

The adaptor socket 62 is configured to closely fit around the body 625 of the adaptor unit 62 when the latter is inserted thereinto. The adaptor socket 62 shown in FIG. 14 is absent the side rails 153 shown in the FIG. 10 embodiment and, instead, comprises elongate socket bodies 650, 651. Each socket body 650, 651 comprises a contact receiver (not shown) at a first, proximal end 654. The socket bodies are joined together by a cross member 655 at their second, distal ends 656.

Figure 15:
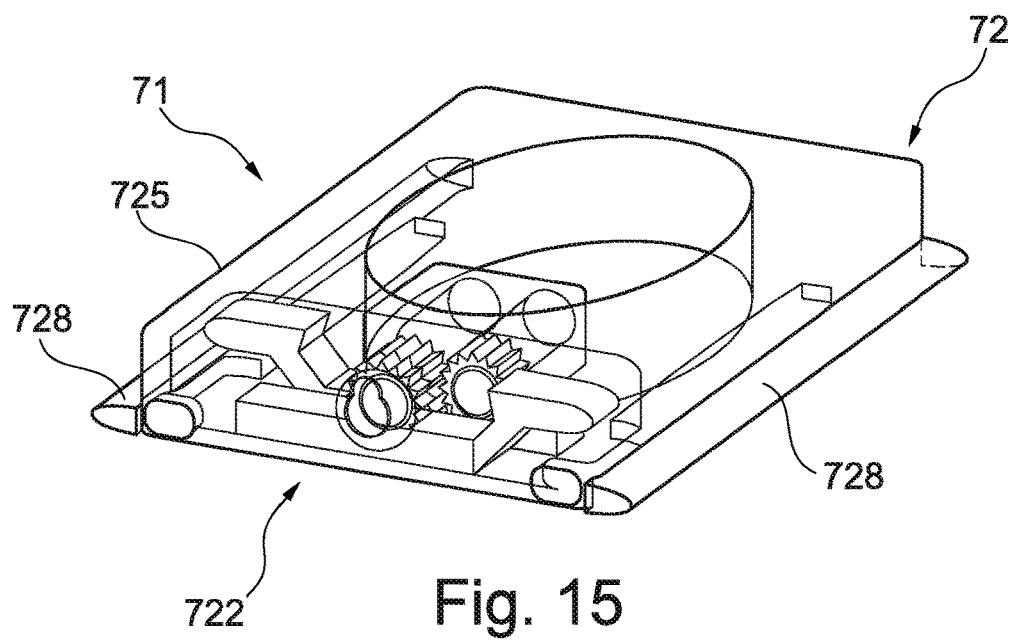
FIG. 15 is a perspective view of an apparatus for changing the battery of a drone according to a further embodiment of the invention.
Figure 16:
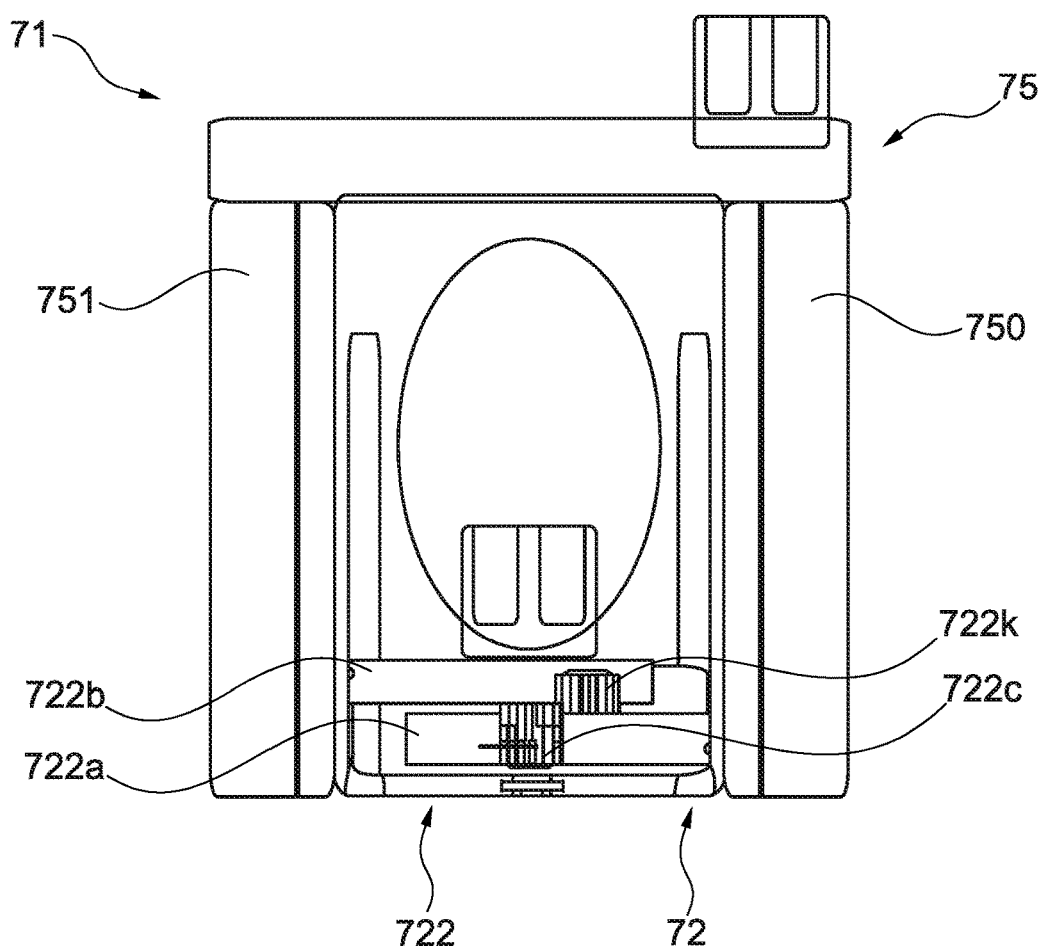
FIG. 16 is plan view of the apparatus shown in FIG. 15 attached to a further adaptor socket.

Referring now to FIGS. 15 and 16, there is shown an apparatus 71 for changing the battery of a drone, according to a further embodiment of the invention, in which features similar to those of the apparatus 1 shown in FIGS. 1 to 7 are identified by a preceding '7' which will not be described herein further. The apparatus 71 shown in FIGS. 15 and 16 differs from that shown in FIG. 14 in that elongate projections 728 extend from opposed sides of the body 725 of the adaptor unit 72, where the projections 728 provide rails 728. Additionally, the movement mechanism 722 comprises offset (in plan) first and second rack gears 722*a*, 722*b* (as best shown in FIG. 16). The first rack gear 722*a* is arranged to be driven, in use, by a first pinion gear 722*c* and the second rack gear 722*b* is arranged to be driven, in use, by a second pinion gear 722*k*. The second pinion gear 722*k* is arranged to be driven, in use, by the first pinion gear 722*c*. The adaptor socket 75 differs from that shown in FIG. 14 in that elongate slots (not shown) are provided in the socket bodies 750, 751, where each elongate slot is configured, in use, to slidably receive one of the rails 728 of the adaptor unit 72. In embodiments, the apparatus 71 may comprise a battery (for example the battery shown in FIG. 1 or FIG. 9) and/or a tool (for example the tool shown in FIGS. 2 and 3 or the tool shown in FIG. 11).

Figure 17:
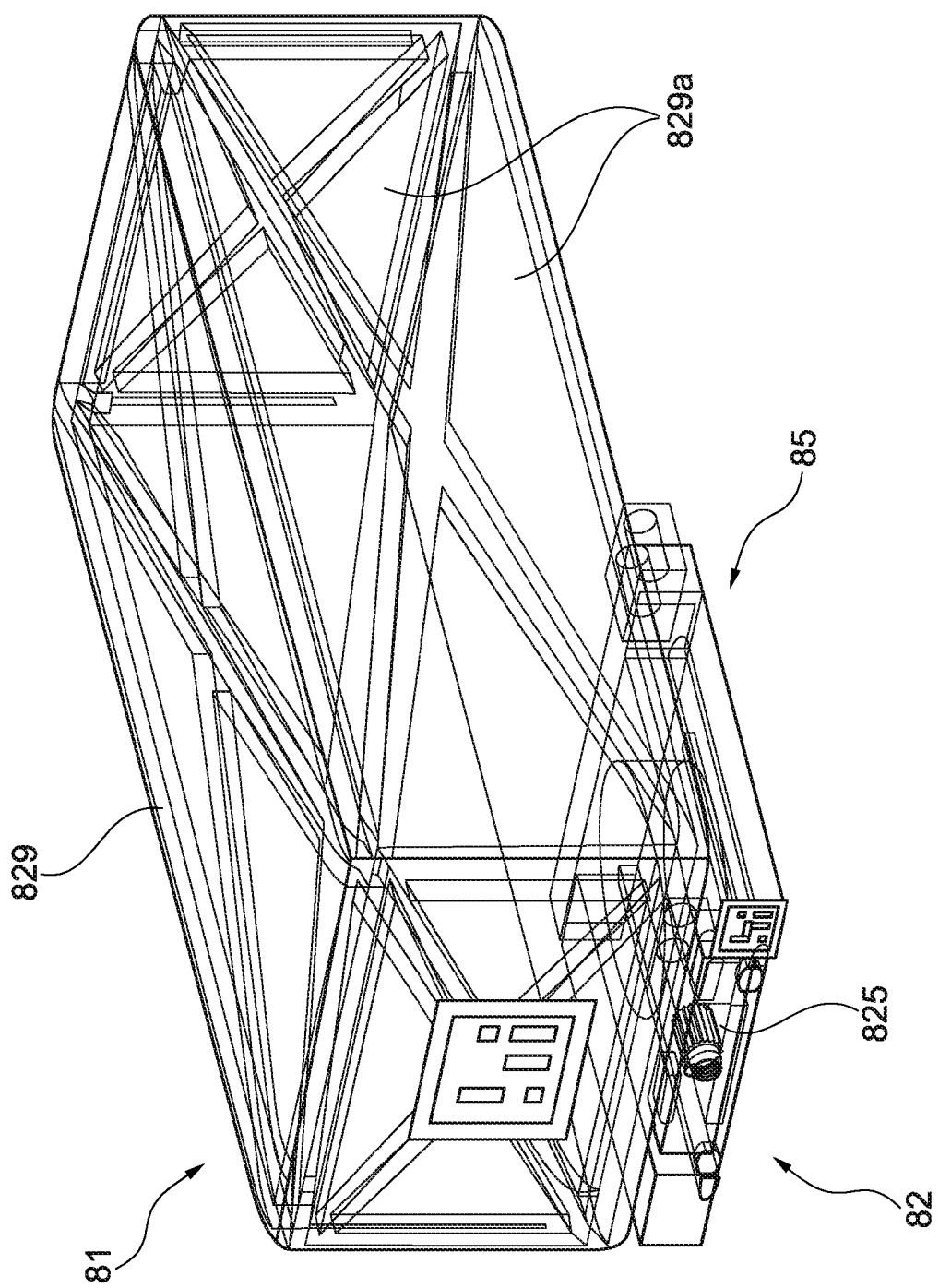
FIG. 17 is a perspective view of an apparatus for changing the battery of a drone according to a further embodiment of the invention attached to a further socket.

Referring now to FIG. 17, there is shown an apparatus 81 for changing the battery of a drone, according to a further embodiment of the invention, in which features similar to those of the apparatus shown in FIGS. 1 to 7 are identified by a preceding '8' and will not be described herein further. The apparatus 81 shown in FIG. 17 differs from that shown in FIGS. 15 and 16 in that the adaptor unit 82 comprises a frame 829 for holding a battery. The frame 829 is attached or attachable to the support surface of the body 825 of the adaptor unit 82. The frame 89 comprises plural openings 829*a*, through which the contents of the frame 829 may be viewed, in use (for example to determine whether or not a battery is contained therein). In embodiments, however, the frame 829 may comprise only one opening 829*a* or may be absent such openings 829*a*. In embodiments, the frame 829 may be at least partially formed from a transparent or translucent material (for example a transparent or translucent plastic). In embodiments, the apparatus 81 may comprise a battery (for example the battery shown in FIG. 1 or FIG. 9) and/or a tool (for example the tool shown in FIGS. 2 and 3 or the tool shown in FIG. 11).

Figure 18:
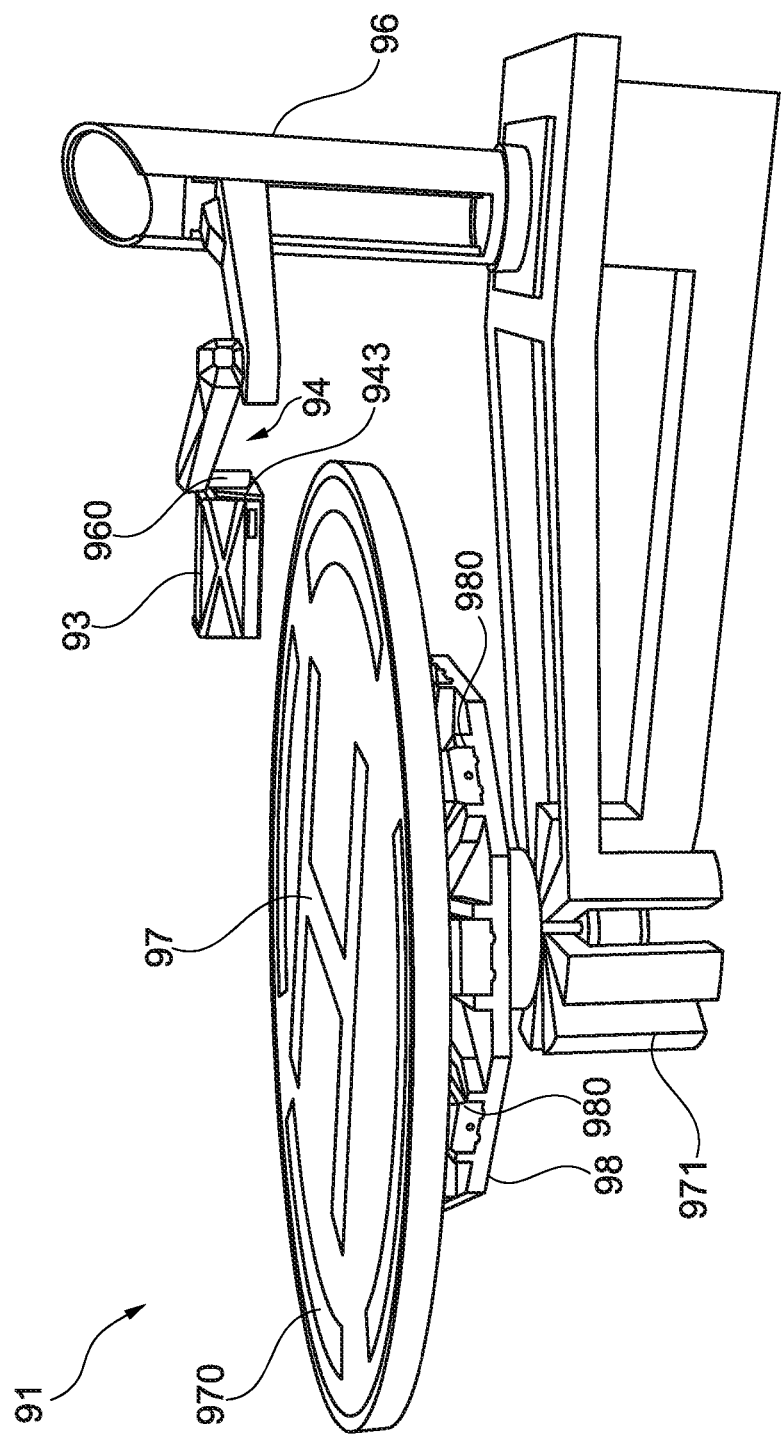
FIG. 18 is a perspective view of an apparatus for changing the battery of a drone according to a further embodiment of the invention.

Referring now to FIG. 18, there is shown an apparatus 91 for changing the battery of a drone, according to a further embodiment of the invention, in which features similar to those of the apparatus shown in FIGS. 1 to 7 are identified by a preceding '9' which will not be described herein further. The apparatus 91 shown in FIG. 18 differs from that shown in FIGS. 1 to 7 in that the apparatus 91 also comprises a robot arm 96, landing pad 97 and a store 98.

The robot arm 96 is attached at its free end 960 to the engagement member 943 of the tool 94. The robot arm is operable, in use, to move the tool 94 to a battery 93 and to engage the tool 94 with an adaptor unit (which is obscured by the battery in FIG. 18) attached to that battery 93.

The landing pad 97 has a landing surface 970 arranged for the landing of a drone thereon. Markings on the landing surface 970 enable location and orientation of the drone relative to the landing surface 970 and the robot arm 96. The landing pad 97 is rotatably supported by a stand 971.

The store 98 is located underneath the landing pad 97, in use, which advantageously at least partially shields the store 98 and its contents from weather conditions, such as rain and the like. The store 98 comprises plural chambers 980 configured to each receive one or more battery. Each chamber 980 comprises a charging station (not shown) configured to charge a battery stored therewithin. The charging station comprises an adaptor socket (not shown) of the type shown in FIG. 6. In use, a battery is inserted into a chamber 980 of the store 98 by the robot arm 96 with the tool 94 engaged in the adaptor unit on the battery. Electrical contact and securement of the battery to the store 98 is then effected as described above in respect of securing and electrically contacting a battery to a drone.

Removal of a charged battery from the store 98 is accomplished by inserting the tool 94 into the adaptor unit on the battery, retracting the first and second contacts (as described in relation to FIG. 4), and then removing the released battery out of its chamber 980.

In use, when a drone lands on the landing surface 970 of the landing pad 97 the robot arm 96 is configured to move the tool 94 to and into engagement with an adaptor unit attached to the battery in the drone. The robot arm 96 is then configured to operate the tool 94 to uncouple the battery from the drone (as described above in respect of FIG. 5). The robot arm 96 then moves the battery from the drone and deposits it in a chamber 980 of the store 98. The battery is secured to the store 98 and electrically connected to the charging station by moving the pair of contacts of the adaptor unit to the second position, as described above in respect of FIG. 5. A charged battery is then removed from the store 98 and installed in or on the drone.

Figure 19:
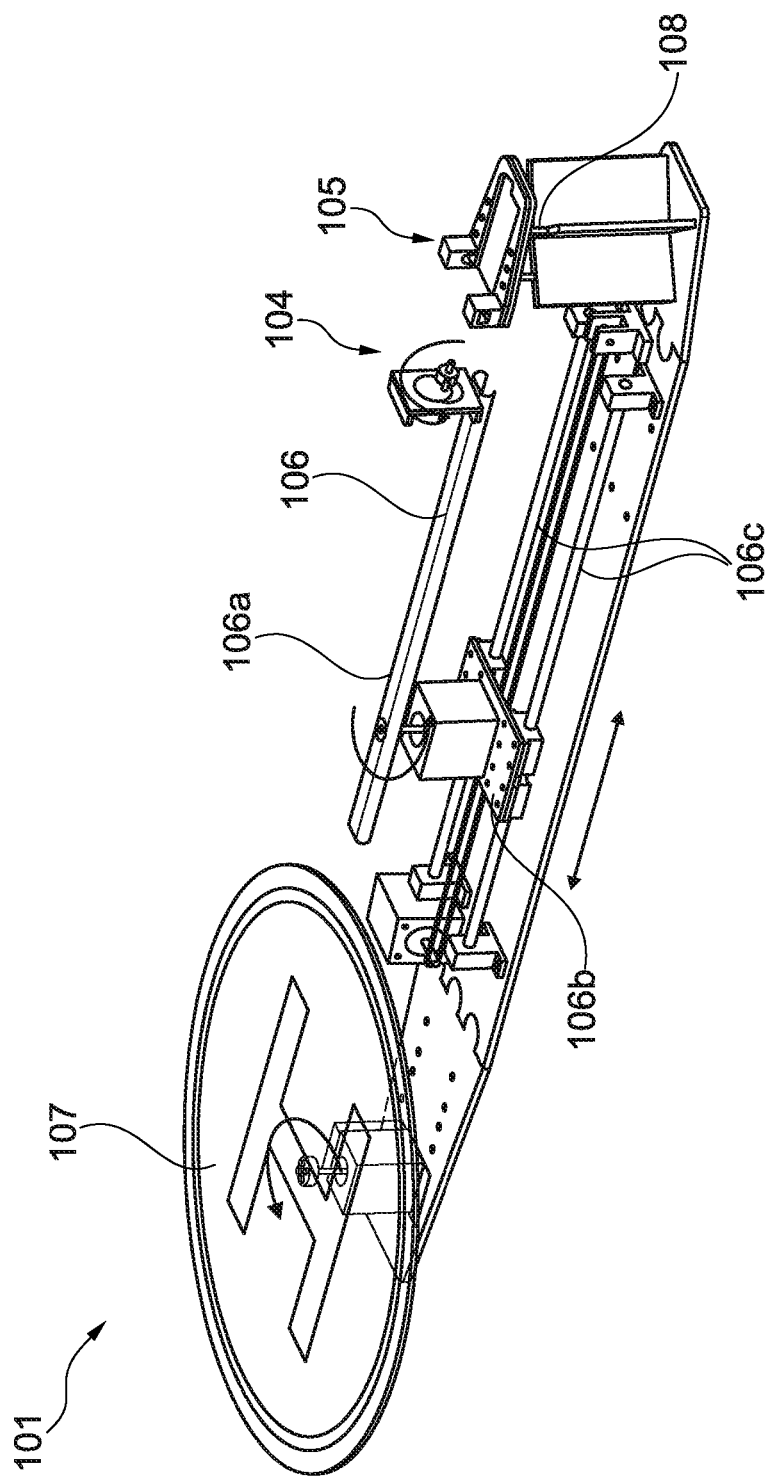
FIG. 19 is a perspective view of an apparatus for changing the battery of a drone according to a further embodiment of the invention.

Referring now to FIG. 19, there is shown an apparatus 101 for changing the battery of a drone, according to a further embodiment of the invention, in which features similar to those of the apparatus 1 shown in FIGS. 1 to 7 are identified by a preceding '10' and will not be described herein further.

The apparatus 101 shown in FIG. 19 differs from that shown in FIG. 18 in that the store 108 is spaced from the landing pad 107 and the robot arm 106 is of a different type. The robot arm 106 of the apparatus 101 shown in FIG. 19 comprises a rotatable arm 106a attached to a support 106b which is movable linearly along rails 106c.

Figure 20:
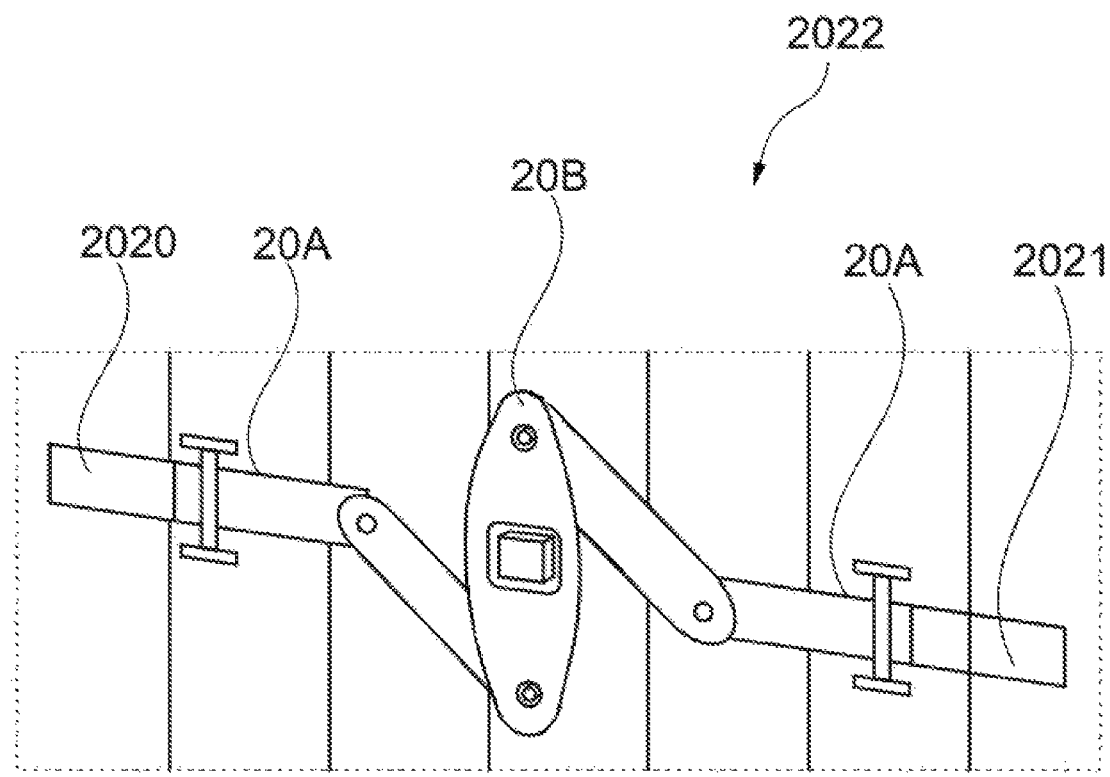
FIG. 20 is a partial side view of a movement mechanism according to a further embodiment of the invention.

Referring now to FIG. 20, there is shown a movement mechanism 2022 suitable for use in any of the apparatus shown in FIGS. 1 to 19. The movement mechanism 2022 differs from the movement mechanism 22 shown in FIG. 1 in that the rack and pinion gear system is replaced by a pivotable arm 20A and rotatable member 20B arrangement. In use, rotation of the rotatable member 20B causes the pivotable arms 20A to pivot relative thereto, and hence to relatively retract or extend into or from a body within which the mechanism 2022 is retained. The contacts 2020, 2021 are attached to the free ends of the arms 20A. Actuation of the movement mechanism 2022 by a tool is similar to the method described above in respect of the apparatus shown in FIGS. 1 to 19.

It will be appreciated by those skilled in the art that several variations to the aforementioned embodiments are envisaged without departing from the scope of the invention. For example, in any of the above embodiments the adaptor socket 5, 15, 65, 75, 85 may be attached or attachable to the battery 3, 13 and/or the adaptor unit 2, 12, 62, 72, 82 may be secured or securable to a drone. Where the adaptor unit 2, 12, 62, 72, 82 is secured or securable to a drone the adaptor unit 2, 12, 62, 72, 82 may comprise plural bodies, for example two bodies and/or the adaptor socket 5, 15, 65, 75, 85 may comprise one body only. Where the adaptor unit 2, 12, 62, 72, 82 is secured or securable to a drone the first electrical connection of the adaptor unit 2, 12, 62, 72, 82 may be connected or connectable to the drone and the second electrical connection may comprise a pair of contacts 20, 21. 120, 121 which are movable, in use, to secure a battery 3, 13 to the drone and to establish electrical connection thereto.

Additionally or alternatively, in embodiments the apparatus shown in FIGS. 1 to 19 may be configured to secure a payload (e.g. a load, a sensor system or a camera) to a drone. Where the apparatus is configured to secure a payload to a drone the electrical contacts may be configured to provide electrical connection between the payload and the drone (for example and hence, indirectly, a battery or other power source in or on the drone). Said electrical connection may, for example be between a camera and the drone (and hence to a power source of the drone). As an alternative, a load (e.g. a package, box or other container or object) may be secured to a drone using movable contacts as specified above, even though the contacts are not used for power or data transmission.

Additionally or alternatively, the pair of contacts 20, 21, 120, 121, 2020, 2021 may be configured to provide a data connection for the transmission of data instead of or as well as providing electrical connection. Additionally or alternatively, the apparatus may comprise one or more pin for data transfer to or from the drone, for example where the one or more pin may be fixed relative to the adaptor body or may be extendable and retractable relative thereto (e.g. via actuation of the movement mechanism).

In embodiments, the tool may be modified for use with more than one type or size of adaptor. For example, the tool may comprise plural projections 40 which may be off different sizes and/or shapes. In embodiments, the tool may comprise a first projection toward the key end and a second projection spaced further from the key end. The second projection may be larger and/or have a different shape to the first projection. The second projection may be configured to engage with a different adaptor to the adaptor that the first projection is configured to engage with. For example, the second projection may be configured to support a larger and/or heavier adaptor and/or battery than is the first projection. Where the tool comprises plural projections the adaptor may be configured to engage with only one of the projections and to allow the other projection(s) to freely rotate.

Additionally or alternatively, the apparatus shown in FIG. 18 or 19 may be mounted or mountable to or on a vehicle, for example for on-the-go transfer of batteries to and from drones.

Additionally or alternatively, the tool 4, 14 may comprise plural engagement members 43, 143, 943, for example two, three or more. The plural engagement members may be arranged to extend in opposed or otherwise different directions and/or to be otherwise spaced from one another. In use, the apparatus shown in FIGS. 18 and 19 may be configured to remove a battery from a drone using a first engagement member of a tool and to then install a second, charged battery pre-loaded onto another engagement member of the tool. In embodiments the tool may comprise two engagement members, each engagement member disposed on opposed sides of the tool. The robot arm may be operable to rotate or swing about or otherwise move the tool such that one or other of the tools is in use to remove or install a battery to a drone.

Additionally or alternatively, any of the above described embodiments the engagement member (and/or the key thereof) may have a unique design, size and/or shape configured to correspond and engage only with a movement mechanism (and/or lock thereof) having a negative but similar design, size and/or shape thereto. In this way a unique engagement member and/or key may be required to remove a battery from a drone.

Additionally or alternatively, the pair of contacts may not provide electrical connection and may only act to secure the battery to a drone. With such an arrangement the battery may comprise its own contacts for engaging with contacts of the drone (for example when secured thereto by the pair of contacts.

Additionally or alternatively, the movement mechanism of any of the above-described embodiments may comprise a locking means or mechanism, for example configured to retain the pair of contacts in the first position and/or in the second position. The locking means or mechanism may comprise a biasing means or biaser, for example a resilient biasing means or biaser. The biasing means or biaser may be arranged to bias part of the movement mechanism toward a locked position or condition. In embodiments, the locking means or mechanism may comprise one or more locking abutments, for instance arranged to imped (partially or completely) movement of the pair of contacts away from the first and/or second position. The biasing means or biaser may be arranged to bias part of the movement mechanism toward and/or into abutment with the or each locking abutment. In use, the engagement member may be operable to overcome (e.g. by pushing) the bias of the biasing means or biaser, for example to thereby move the part of the movement mechanism away from and/or out of abutment with the or each locking abutment. When the engagement member is disengaged from the movement mechanism the biasing means or biaser may bias the movement mechanism (e.g. at least a part thereof) into a locked condition or position, for example into abutment with the or each locking abutment.

Additionally or alternatively, although the apparatus 1, 11 shown in FIGS. 1 to 7 and FIGS. 8 to 13 comprises a battery 3, 13, a tool 4, 14 and an adaptor socket 5, 15 this need not be the case and, in embodiments, the apparatus 1, 11 may be absent the battery 3, 13 and/or the tool 4, 14 and/or the adaptor socket 5, 15. Where an adaptor socket 5, 15 is not provided the contacts 20, 21, 120, 121 may be configured to be receivable, in use, within contact receivers in or on a drone.

Additionally or alternatively, although the plates 22d, 22e, 22f, 22g of the movement mechanism 22 are secured to one another by securements such as bolts in the embodiment shown in FIGS. 1 to 7 this need not be the case and, instead the plates 22d, 22e, 22f, 22g may be secured together by any suitable means, for example by adhesive.

Additionally or alternatively, although the movement mechanism 22 shown in FIG. 1 comprises plural plates 22d, 22e, 22f, 22g this need not be the case and instead, in embodiments, the movement mechanism 22 may comprise an at least substantially unitary body. Gears may be located or locatable within such a substantially unitary body.

Additionally or alternatively, although the adaptor unit 2 shown in FIG. 1 comprises an attachment plate 23 and a support plate 24 this need not be the case and instead the adaptor may be absent the attachment plate 23 and/or an support plate 24. Where the adaptor is absent both an attachment plate 23 and a securement plate 24 the directing plate 22g of the movement mechanism 22 may be attached or attachable to the battery 3. Additionally or alternatively, the attachment plate 23 and/or the support plate 24 may, in embodiments, comprise a non-plate shape and may instead comprise any suitable form.

Additionally or alternatively, although the movement mechanism 22, 122, 722 shown in the above-described embodiments comprises rack gears 22a, 22b, 122a, 122b, 722a, 722b and pinion gears 22c, 122c, 722c, 722k this need not be the case and, instead, the movement mechanism 22, 122, 722 may comprise any mechanism suitable for moving the first and second contacts 20, 21, 120, 121 between the first and second positions. For example, the movement mechanism 22, 122, 722 may comprise an expandable or inflatable member or body to which the first and second contacts 20, 21, 120, 121 may be attached or attachable.

Additionally or alternatively, any of the embodiments shown in FIGS. 1 to 17 may comprise the robot arm 96, 106 and/or landing pad 97, 107 and/or store 98, 108 shown in FIG. 18 or 19.

Additionally or alternatively, in embodiments, any of the above-described embodiments may comprise more than two movable contacts.

Additionally or alternatively, in embodiments, any of the above-described embodiments may comprise one or more sensors configured or configurable to determine whether or not the battery 3, 13 has been successfully locked to or unlocked from the drone. The tool 4, 14 may comprise the, some or each of the one or more sensors. The, some or each sensor may comprise a limit switch.

Additionally or alternatively, any of the above-described embodiments may comprise a drone. The drone may comprise a back-up or reserve power source, for example configured to maintain an idle state of the drone when a battery is removed (e.g. for charging).

It will also be appreciated by those skilled in the art that any number of combinations of the aforementioned features and/or those shown in the appended drawings provide clear advantages over the prior art and are therefore within the scope of the invention described herein.

The invention claimed is:

1. An apparatus for changing a power source of a drone, the apparatus comprising an adaptor for securing a power source to a drone and comprising a first energy connection for supplying energy from the power source and a second energy connection for supplying energy to a drone, wherein one of the first and second energy connections comprises a pair of energy links which are movable between a first position to facilitate energy supply and secure the power source to the drone and a second position to interrupt energy supply and enable the power source to be removed from the drone.

2. An apparatus according to claim 1, wherein the power source comprises a battery, the first and second energy connections comprise first and second electrical connections and the pair of energy links comprise contacts, wherein in the first position the pair of contacts facilitate electrical contact to the drone and in the second position electrical contact is interrupted.

3. An apparatus according to claim 1, wherein when the second pair of energy links or contacts are in the second position at least part of the adaptor is removable from the drone.

4. An apparatus according to claim 1, wherein movement of the pair of energy links or contacts toward the first position simultaneously facilitates energy supply or electrical contact and secures the power source or battery to the drone.

5. An apparatus according to claim 1, comprising a first body configured to support the power source or battery.

6. An apparatus according to claim 5, wherein the pair of energy links or contacts extend or project outboard of the first body in the first position.

7. An apparatus according to claim 5, wherein the pair of energy links or contacts are inboard of the periphery of the first body in the second position.

8. An apparatus according to claim 5, wherein the pair of energy links or contacts are extendable from the first body and/or are retractable into the first body.

9. An apparatus according to claim 1, comprising a movement mechanism which is operable, in use, to move the pair of energy links or contacts from the first position to or toward the second position and/or is operable, in use, to move the pair of energy links or contacts from the second position to or toward the first position.

10. An apparatus according to claim 9, comprising a first body configured to support the power source or battery, wherein the movement mechanism is operable, in use, to expand or decrease the or a width of the first body.

11. An apparatus according to claim 9, wherein the movement mechanism comprises a gear system.

12. An apparatus according to claim 11, wherein the gear system comprises a rack and pinion arrangement.

13. An apparatus according to claim 1, comprising an engagement mechanism for engaging, in use, the adaptor and causing the pair of energy links or contacts to move toward or away from the first position.

14. An apparatus according to claim 13, wherein the movement mechanism comprises a lock and the engagement mechanism comprises a key configured to engage, in use, with the lock.

15. An apparatus according to claim 1, comprising a second body secured or securable to the drone.

16. An apparatus according to claim 15, wherein the second body comprises one or more energy link or contact receivers into which the pair of energy links or contacts are receivable, in use.

17. An apparatus according to claim 1, comprising a support mechanism for moving a power source or battery to or from a drone, in use.

18. An apparatus according to claim 17, wherein the support mechanism is configured, in use, to move the engagement mechanism to engage with the movement mechanism.

19. An apparatus according to claim 1, comprising a store for storing power sources or batteries.

20. An apparatus according to claim 19, wherein the store is configured or configurable to replenish or recharge a power source or battery and/or is configured or configurable to monitor the status of a power source or battery and/or is configured or configurable to transmit information relating to the status of a power source or battery.

* * * * *